US009010990B2

(12) United States Patent
Branson, III et al.

(10) Patent No.: US 9,010,990 B2
(45) Date of Patent: Apr. 21, 2015

(54) SHAFT-ACTUATED SPINDLE MIXER

(75) Inventors: Benjamin H. Branson, III, Mechanicsville, VA (US); Ernest B. Pryor, Jr., Maidens, VA (US); Michael G. Sandford, Chester, VA (US); Brian Paul Williams, Midlothian, VA (US); Ann Marie Blackmon, Richmond, VA (US)

(73) Assignee: Hamilton Beach Brands, Inc, Glen Allen, VA (US)

( * ) Notice: Subject to any disclaimer, the term of this patent is extended or adjusted under 35 U.S.C. 154(b) by 1035 days.

(21) Appl. No.: 13/053,736

(22) Filed: Mar. 22, 2011

(65) Prior Publication Data

US 2011/0235462 A1 Sep. 29, 2011

Related U.S. Application Data

(60) Provisional application No. 61/318,591, filed on Mar. 29, 2010.

(51) Int. Cl.
*A47J 43/044* (2006.01)
*B01F 7/16* (2006.01)

(52) U.S. Cl.
CPC .................................... *B01F 7/1605* (2013.01)

(58) Field of Classification Search
CPC ...................................................... A47J 43/044
USPC .................................................. 366/206, 601
See application file for complete search history.

(56) References Cited

U.S. PATENT DOCUMENTS

| | | | | |
|---|---|---|---|---|
| 1,480,914 | A | 1/1924 | Poplawski | |
| 1,489,652 | A * | 4/1924 | Zawistowski et al. | 416/150 |
| 2,300,542 | A | 11/1942 | Forse | |
| 2,498,570 | A | 3/1945 | Myers | |
| 2,912,633 | A | 11/1959 | Nebinger et al. | |
| 3,224,743 | A | 12/1965 | Freedman et al. | |
| 3,292,912 | A | 12/1966 | Stubler | |
| 3,943,421 | A | 3/1976 | Shibata et al. | |
| 4,351,612 | A | 9/1982 | Valbona et al. | |
| 4,518,263 | A | 5/1985 | Brym et al. | |
| 4,822,172 | A | 4/1989 | Stottmann | |
| 5,347,205 | A | 9/1994 | Piland | |
| 5,372,422 | A | 12/1994 | Dubroy | |
| 5,845,991 | A | 12/1998 | Sundquist | |
| 6,364,522 | B2 | 4/2002 | Kolar et al. | |
| 6,402,365 | B1 | 6/2002 | Wong | |
| 6,439,760 | B1 | 8/2002 | Langeloh et al. | |
| 6,585,404 | B2 | 7/2003 | Barton et al. | |

(Continued)

*Primary Examiner* — David Sorkin
(74) *Attorney, Agent, or Firm* — Alexander D. Raring

(57) ABSTRACT

The disclosed apparatus, system and method relate to a shaft-actuated spindle mixer where the spindle mixer includes a motor and at least one motor switch enclosed in a mixer housing. A spindle shaft extends from the housing and is mechanically connected to the motor. The motor is mounted to a moveable mixer component such that the spindle shaft can be displaced to thereby causing the associated movement of the enclosed motor and moveable mixer component to which the motor is mounted. Movement of the movable mixer component actuates a switch. Actuating the switch causes the selective activation of the mixer motor. Activating the mixer motor rotates the spindle shaft. The disclosed apparatus and method provide for the optional one-handed operation of a spindle mixer, eliminate the need for a user or a cup to directly contact a switch to engage the spindle mixer, and further provides for the sanitary operation of a spindle mixer.

4 Claims, 11 Drawing Sheets

(56) References Cited

U.S. PATENT DOCUMENTS

| | | | |
|---|---|---|---|
| 6,609,821 | B2 | 8/2003 | Wulf et al. |
| 6,634,782 | B2 | 10/2003 | Barton et al. |
| 6,811,303 | B2 | 11/2004 | Dickson, Jr. |
| 6,814,321 | B2 | 11/2004 | Schorn et al. |
| 7,183,507 | B2 | 2/2007 | Simoneau |
| 7,207,711 | B2 | 4/2007 | Huang et al. |
| 7,273,315 | B2 | 9/2007 | Huang et al. |
| 7,591,438 | B2 | 9/2009 | Bohannon, Jr. et al. |
| 7,775,705 | B2 | 8/2010 | Kozlowski et al. |
| 7,780,338 | B2 | 8/2010 | Olson et al. |

* cited by examiner

SHAFT-ACTUATED SPINDLE MIXER

This application claims the benefit of U.S. Provisional Application No. 61/318,591, filed on Mar. 29, 2010.

FIELD OF THE DISCLOSURE

The present disclosure is directed to a spindle mixer. Specifically, the disclosure relates to a spindle mixer wherein a mixer motor is optionally activated via manual displacement of a spindle shaft extending from the motor. More particularly, the disclosure relates to an internally housed switch that is actuated via the displacement of the spindle shaft where the switch selectively energizes the mixer motor. The movement of the spindle shaft causes the corresponding movement of a spindle mixer component such as a motor mount plate, a ball and socket arrangement, or the like. The movement of the mixer component engages and actuates a switch electrically connected (as through a printed circuit board assembly) to the mixer motor. In this manner, a user of the spindle mixer can start and stop the spindle mixer motor (i.e., start or stop a mix cycle), which is concealed in a housing, by displacing the spindle shaft.

BACKGROUND

Spindle mixers are used to mix food or a viscous product in a cup. The typical mixers comprise stands or housings supporting a motor in an elevated position. A spindle shaft extends downwardly from the motor. Users typically insert the cup around the spindle shaft with one hand. With the other hand, the user engages an on-off switch. Engaging the motor causes a blade/agitator on the spindle shaft to rotate so as to mix, blend, cut, or otherwise agitate the contents of the cup.

Spindle mixers are employed in residential and commercial settings. Spindle mixers found in commercial establishments may be used by an employee or on a self-serve basis.

In a conventional spindle mixer, the motor is engaged by manually actuating the on-off switch. Typically, one of the user's hands holds the cup with the contents to be mixed while the user's other hand engages the on-off switch. This may be inconvenient or difficult for the user to accomplish.

Spindle mixers can include switches that are directly contacted by the mixing cup in order to engage a motor. For instance, the cup can be inserted into a cup guide where the rim of the cup engages a slidable switch. A cup could also press against an activation "paddle". However, problems exist with known spindle mixer constructions. Specifically, the exposed switches, paddles and/or interlock assemblies can be fouled or contaminated with the product to be mixed. Any external structure, parts, or the like proximate to the spindle shaft can not only become contaminated/fouled but can also generally complicate the cleaning process. The owner of the present application has previously addressed this issue, at least in part, as disclosed in U.S. Pat. No. 7,780,338.

In further detail, once a spindle mixer motor is activated, a spindle shaft with an agitator rotates to mix the contents of a cup. The spindle mixer's agitator may splash food or drink from the cup during a mix cycle. The user may also prematurely remove the cup from the agitator (i.e., while the spindle shaft is still rotating) in which case food product will be dispersed from the agitator onto the spindle mixer. For that reason, the space around the agitator shaft may be enclosed or at least partially enclosed. Further, it is generally advisable to clean a spindle mixer after use. Any brackets, switches, cup guides, or the like on the spindle mixer can require additional cleaning or otherwise hamper the cleaning process. The operation of any exposed switches, cup guides, or the like can also be impaired by food contamination or by frequent exposure to the cleaning process.

An improved spindle mixer would be easy to operate and clean. An improved apparatus would prevent a drink or food product from entering the mixer housing or fouling any exterior components. A spindle mixer in accordance with the following disclosure addresses these or other shortcomings of conventional spindle mixers.

SUMMARY

The present disclosure is directed to a spindle mixer and method of operating the same wherein the manual displacement of a spindle shaft can activate a mixer motor. The subject spindle mixer permits for one-handed operation by providing a motor switch directly activated by the manual displacement of the spindle shaft. More particularly, at least one motor switch is completely concealed within a mixer housing. As a result, the motor switch(es) will not come into contact with any food or drink product. A separate, manual on-off and/or pulse switch can also be provided to manually activate the mixer motor and to bypass the spindle-actuated motor switch.

Broadly, the subject apparatus and system comprises a spindle mixer with a housing. A motor is enclosed in the housing, and the motor mounted to a moveable mixer component positioned within the housing. At least one motor switch is also enclosed by the housing. The at least one motor switch is actuated by the movement of the moveable mixer component. A spindle shaft is mechanically connected to the motor and extends from the housing. The spindle shaft can be forcibly displaced by a user. The displacement of the spindle shaft actuates the (one or more) motor switch(es) via the moveable mixer component. The actuation of the motor switch selectively energizes the motor in order to rotate the spindle shaft.

The space around the spindle shaft may be at least partially enclosed. The housing is free of any cup guides, cup-engaged paddles or switches, or the like.

In further detail, the subject motor is mounted to a mixer component, such as a plate, ball-in-socket arrangement, or other structure, that permits the relative movement of the motor about one or more axes. Similarly, as the spindle shaft is connected to the motor, the spindle shaft also has a range of motion. Movement of the motor is caused by the manual, forcible displacement of the spindle shaft by a user. Movement of the motor causes the associated movement of the mixer component to which the motor is mounted. The movement of the mixer component selectively actuates at least one motor switch. The at least one motor switch is electrically connected to the mixer motor. Actuating the switch selectively energizes the mixer motor. When energized, the mixer motor rotates the spindle shaft.

In one embodiment, the mixing motor connected to the spindle shaft is mounted to a moveable component where the component comprises a motor mount plate. Displacement of the spindle shaft causes the relative movement of the motor mount plate. One or more switches are actuated via the movement of the motor mount plate so as to selectively energize the motor. The motor then rotates the spindle shaft to mix the contents of a cup.

In another embodiment, a switch apparatus comprises at least one motor switch and a ball and socket arrangement wherein the at least one switch is engaged via rotation of the ball within the socket. The mixer motor is mounted to the ball member, and the ball member rotates due to the displacement of the spindle shaft and mixer motor.

In yet another embodiment, the switch assembly may instead comprise a contact ring wherein movement of the spindle shaft displaces the contact ring in order to create a contact point. The connection at the contact point would be operable to energize the mixer motor. Other techniques for actuating the internal motor switch will become evident to one of skill in the art based on subject disclosure.

In use, a user selects a mode of operation, such a manual mode or preset mix cycle mode. The user then places the cup in position so as to partially surround the spindle shaft. The user then manually displaces the spindle shaft so as to cause the movement of the mixer motor as mounted to a moveable mixer component. The corresponding movement of the mixer component engages at least one motor switch. The actuation of the motor switch then selectively energizes or de-energizes the mixer motor so as to start or stop the rotation of the spindle shaft. The user need not engage an on-off switch, and the cup does not come into direct contact with a switch.

The manual mode would allow the mixing mode to operate at a user-selected speed. In the preset mix cycle mode, the motor is energized and operated to preset parameters or operating characteristics. For instance, a ramp up speed, target speed, variable speeds, time of operation, and the like might be electronically controlled so that the cycle proceeds and terminates automatically upon activation of the motor. A separate, manual on-off and/or pulse switch can also be provided to manually activate the mixer motor and to bypass the spindle-actuated motor switch.

A spindle mixer in accordance with the present disclosure is easy to operate relative to conventional spindle mixers. The ease of operation is specifically aided by the fact that in at least one mode of operation, the user and/or cup do not have to directly contact a switch, actuating paddle or arm, cup guide, or the like. In fact, the spindle mixer does not include any switches, cup guides, brackets, or the like to be directly engaged by the cup. As such, the spindle mixer disclosed herein is relatively easy to clean and is more sanitary. Further features and advantages of the present disclosure will become apparent to those of skill in the art from the following detailed description of a preferred embodiment taken in conjunction with the accompanying drawings.

DETAILED DESCRIPTION

The present disclosure is directed to spindle mixer. The spindle mixer is described in terms of various embodiments disclosed and illustrated herein. In general, the spindle mixer comprises a novel construction and method of operation. A displaceable spindle shaft actuates a mixer motor via at least one motor switch internally housed by the spindle mixer. The area proximate the spindle shaft, and exterior to a housing defining the spindle mixer, is free of switches, brackets, cup guides, or the like that might otherwise become contaminated by foodstuff due to the operation of the spindle mixer. Of course, the present disclosure is not limited to the specific embodiments disclosed herein but also includes variations and equivalent structures that would be apparent to one of skill in the art in light of the subject disclosure.

Figure 1:
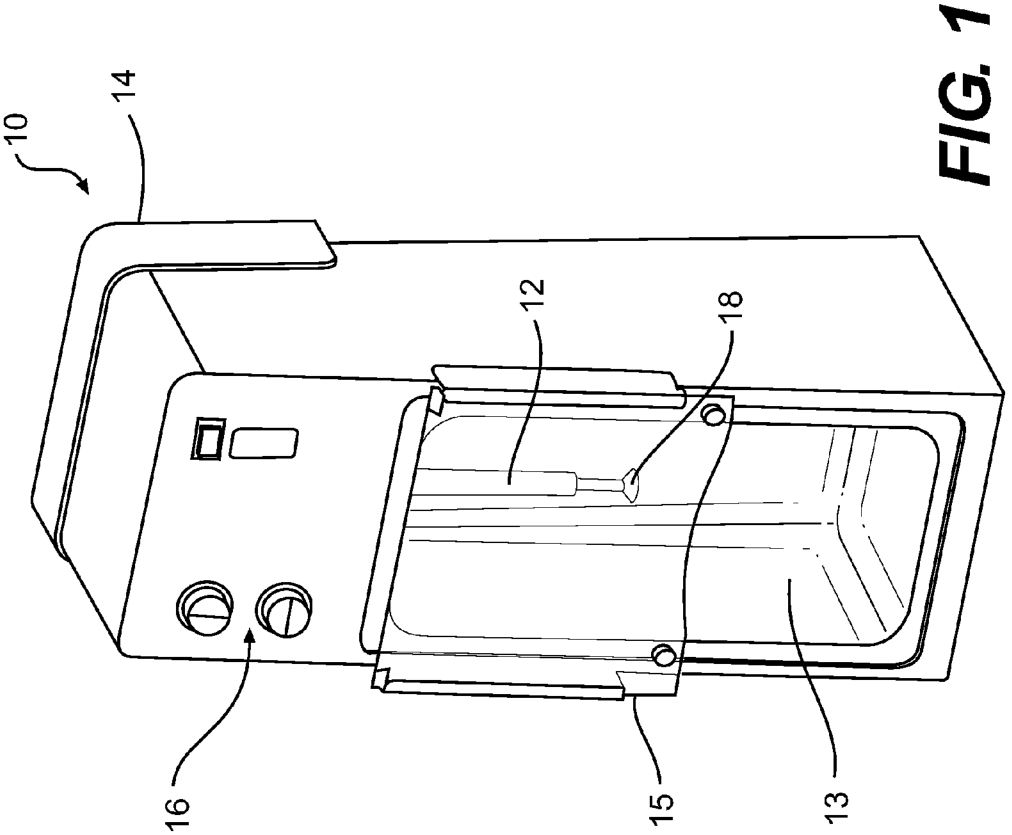
FIG. 1 is a perspective view of a spindle mixer including a shaft-actuated motor switch in accordance with the present disclosure.

Turning now to the drawings, FIG. 1 illustrates a spindle mixer 10 with a spindle shaft 12 and mixer housing 14. A mixer motor is enclosed by housing 14. Broadly, the displacement or actuation of spindle shaft 12 activates the mixer motor, as described in detail below. A control panel 11 also provides a separate, manual on-off switch and/or pulse switch to thereby allow for the activation the spindle mixer without displacement of the spindle shaft. It is, therefore, possible in one embodiment to bypass the spindle-actuated motor switch as described herein.

In further detail, the subject spindle mixer 10 facilitates the one-handed operation of a spindle mixer by providing a means to actuate at least one motor switch that is internally housed in mixer 10 via spindle shaft 12. The at least one motor switch is actuated via a moveable mixer component to which the mixer motor is mounted. The component might comprise a mounting plate, a ball and socket arrangement, a contact ring, or the like.

Figure 2:
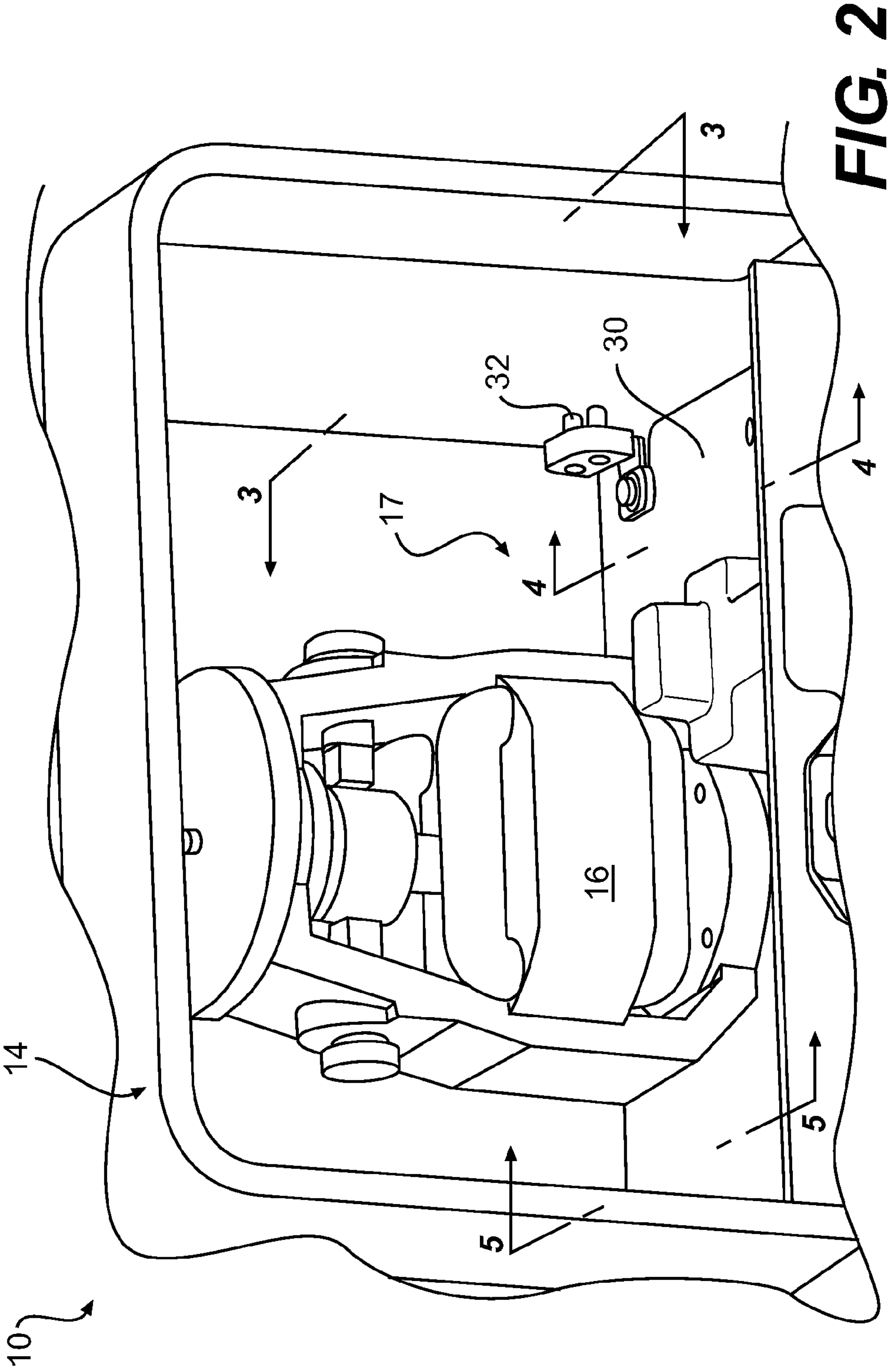
FIG. 2 is a rear view of one embodiment of a spindle mixer where a motor housing is revealed to illustrate a motor switch, moveable mixer component, and a motor mounted to the component as disclosed herein.
Figure 3B:
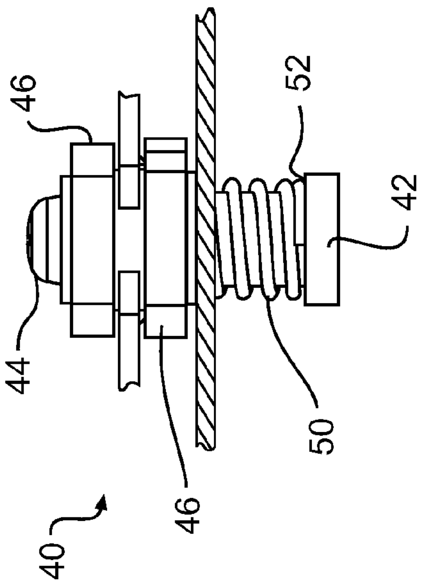
FIG. 3B is a magnified view of a portion thereof.
Figure 3A:
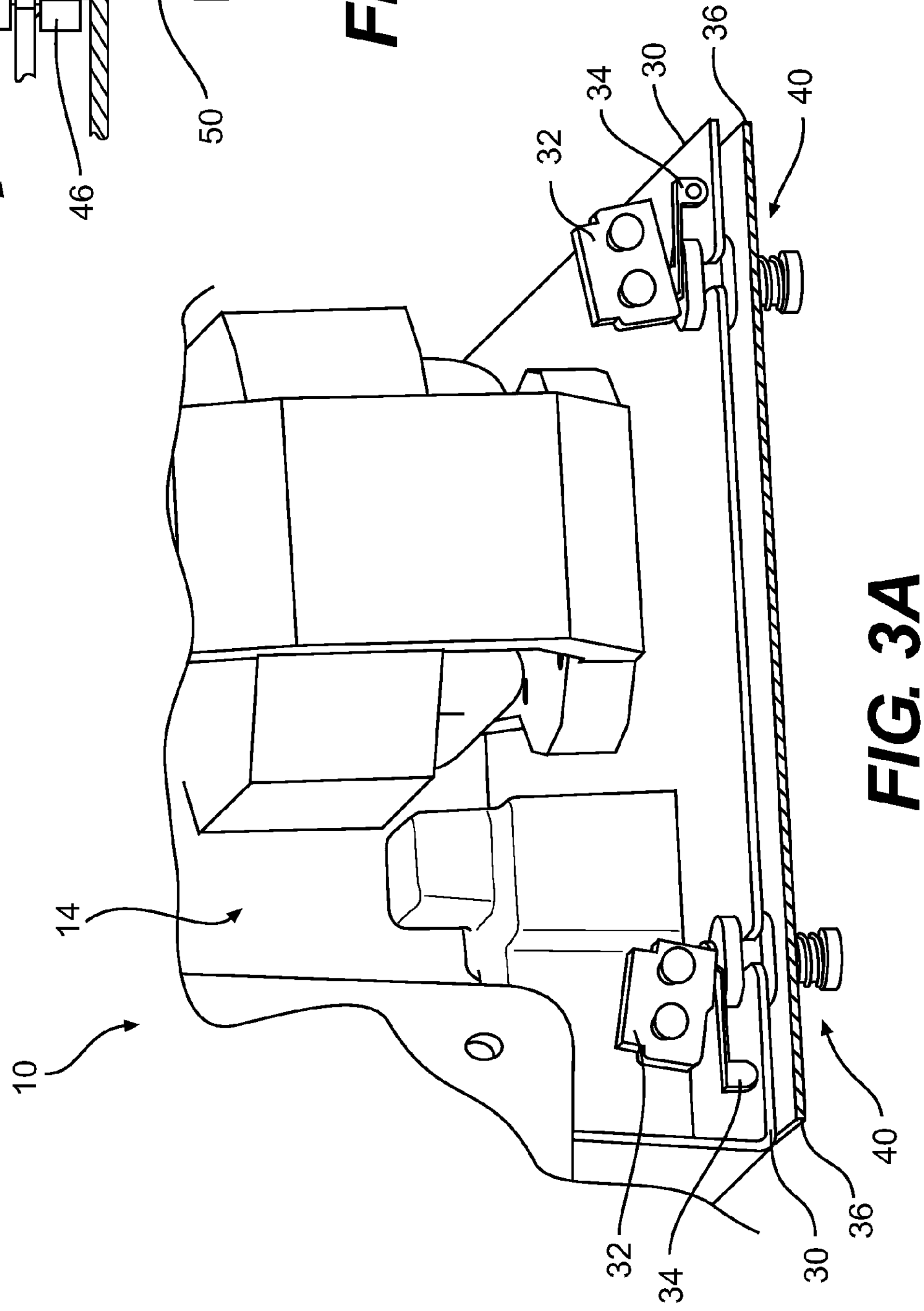
FIG. 3A is a cross-sectional view along line 3-3 further illustrating one embodiment of the subject apparatus.
Figure 4:
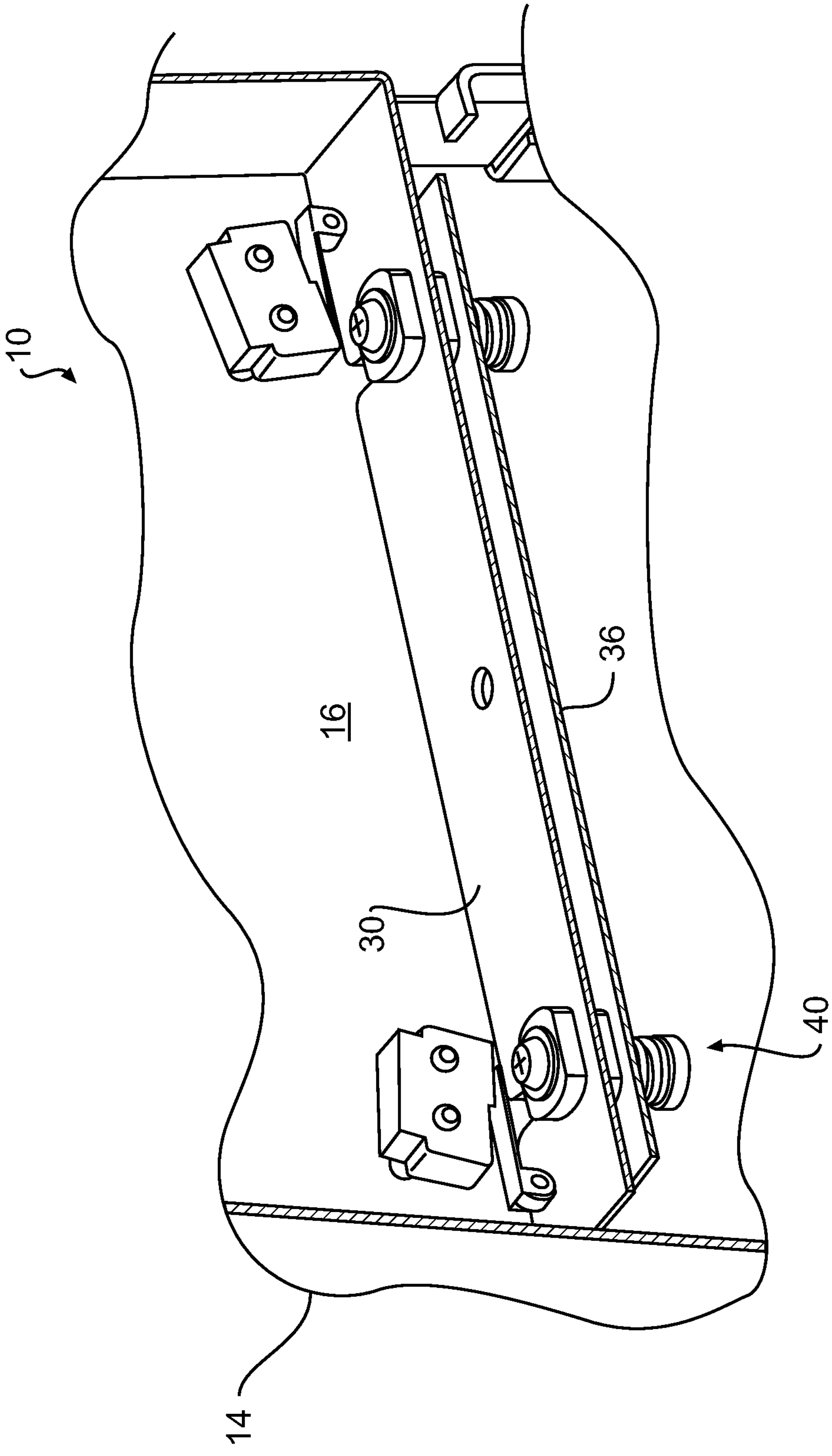
FIG. 4 is a cross-sectional view along line 4-4 to further illustrate one embodiment of the subject apparatus.
Figure 5:
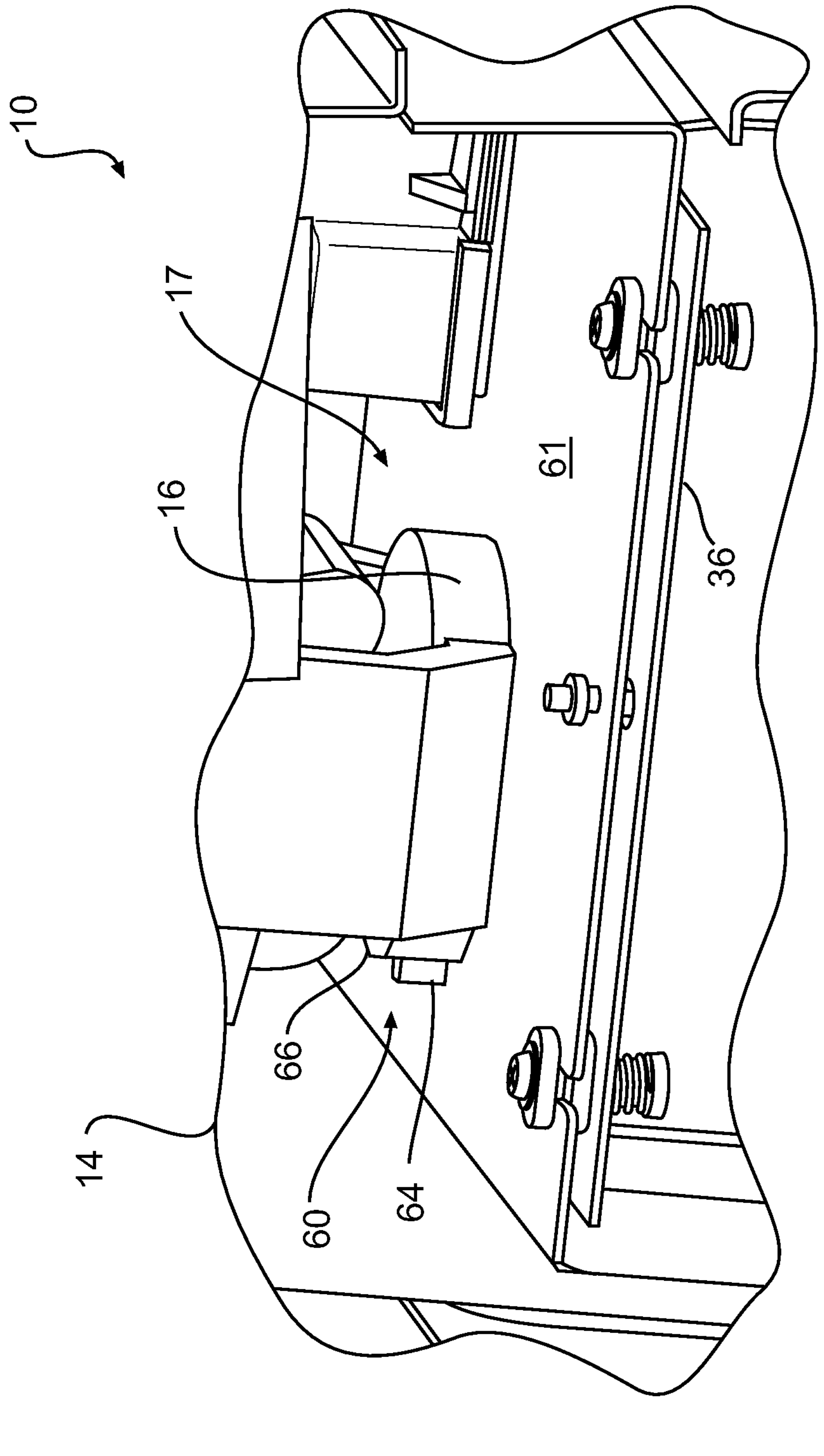
FIG. 5 is a cross-section view along line 5-5 to further illustrate one embodiment of the subject apparatus.
Figure 6:
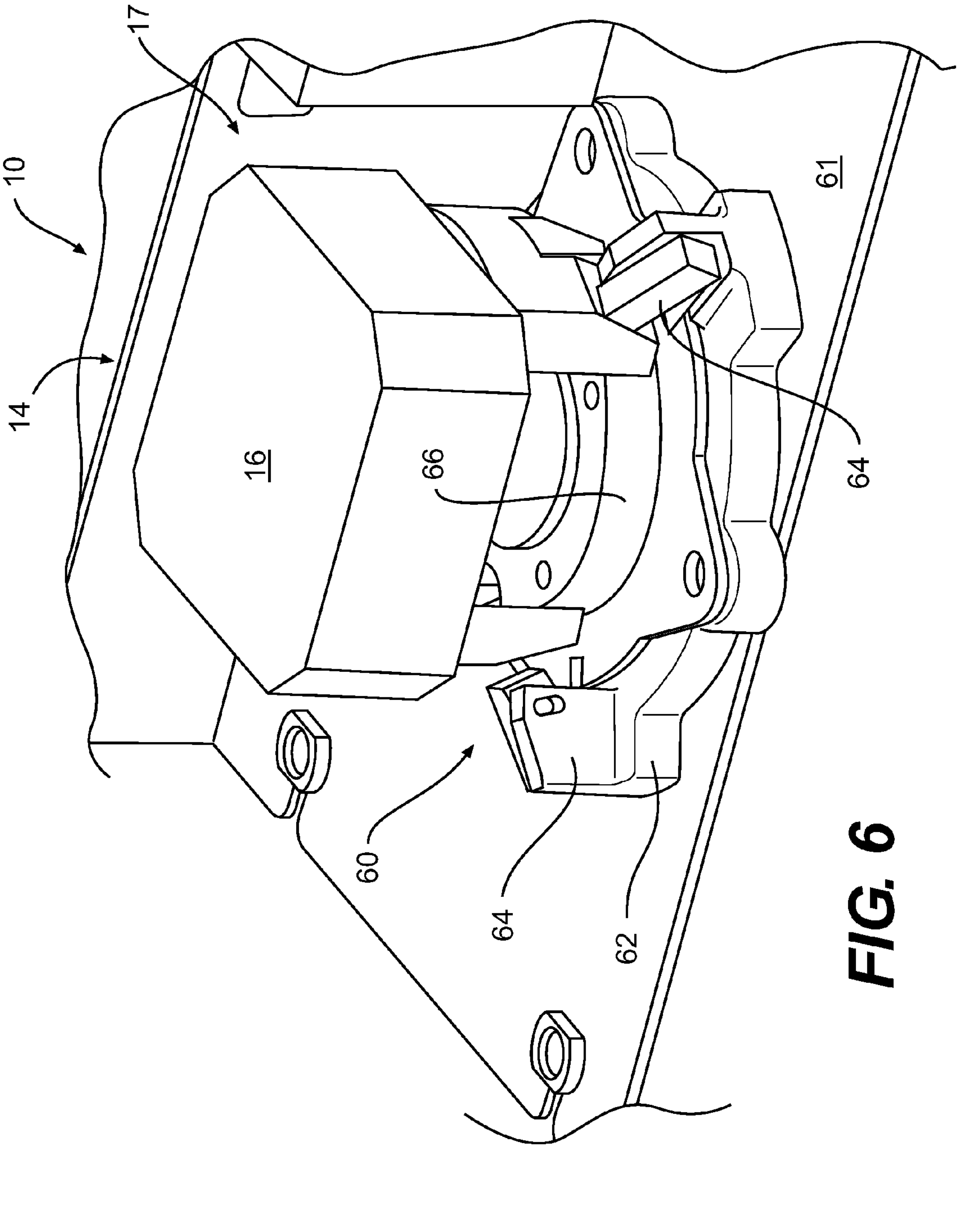
FIG. 6 is a rear view of another embodiment of a spindle mixer where the motor housing is open to illustrate a motor switch, moveable mixer component, and a motor mounted to the component as disclosed herein.
Figure 7:
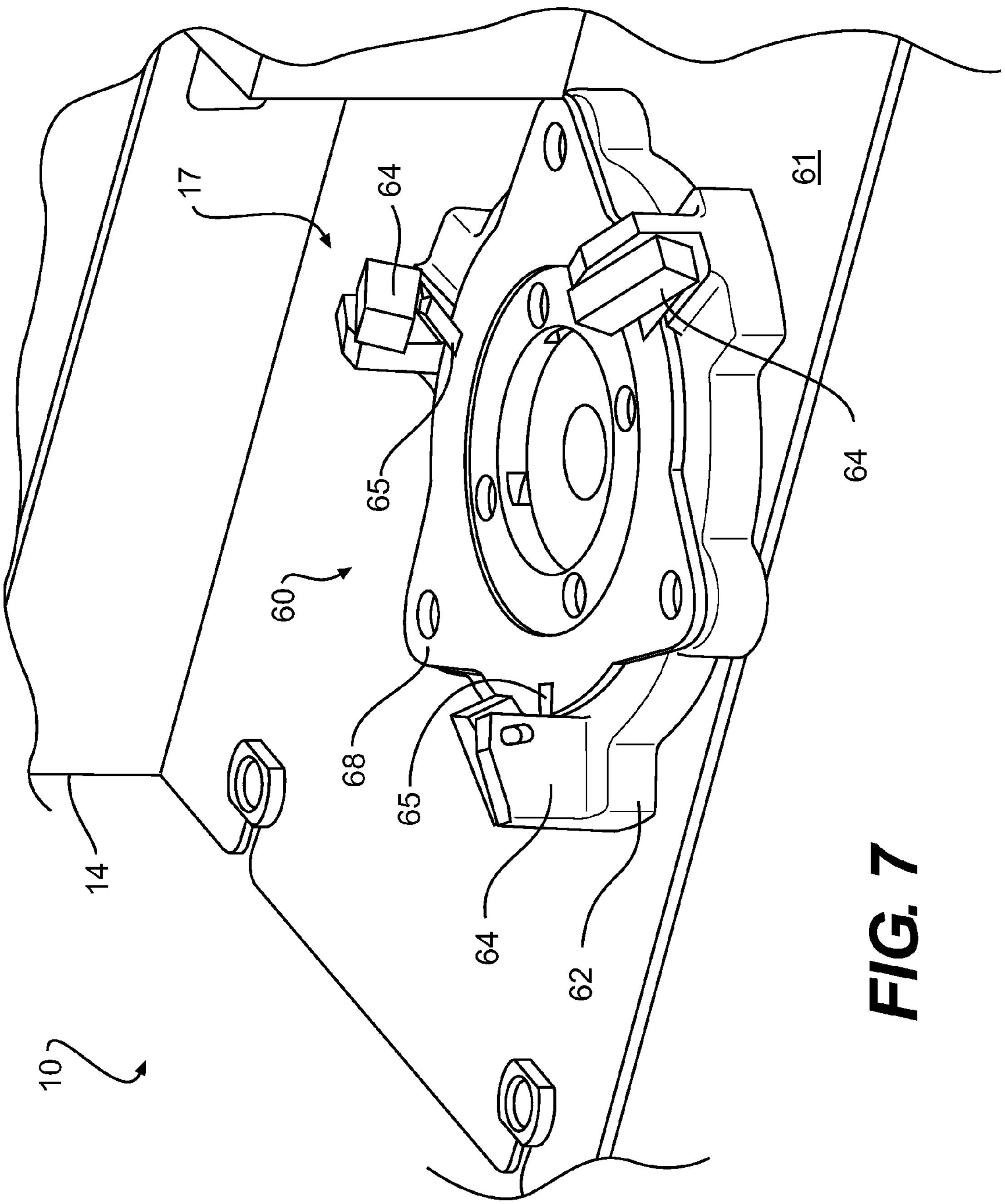
FIG. 7 is an additional view thereof with the mixer motor removed.
Figure 8:
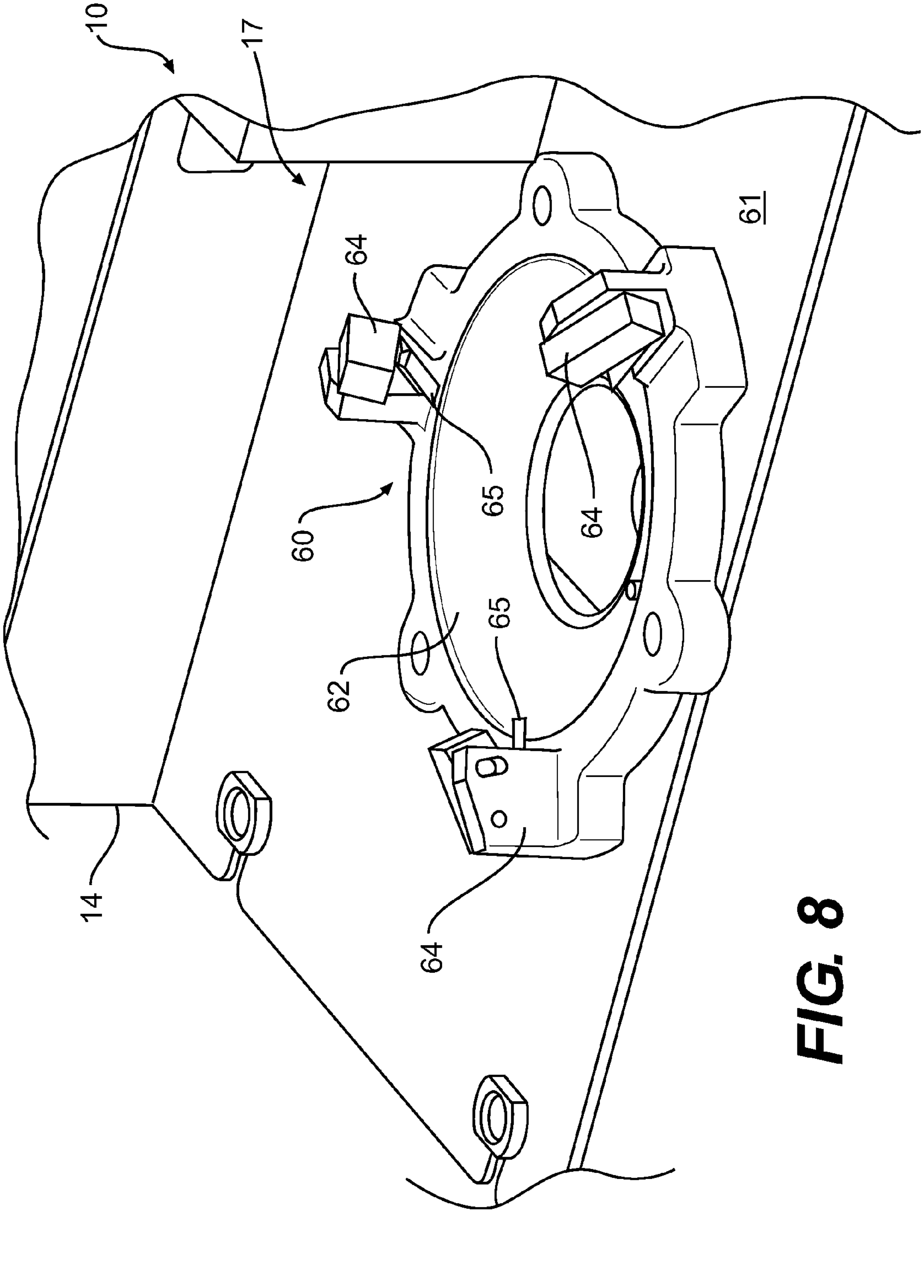
FIG. 8 is an additional view thereof.
Figure 9:
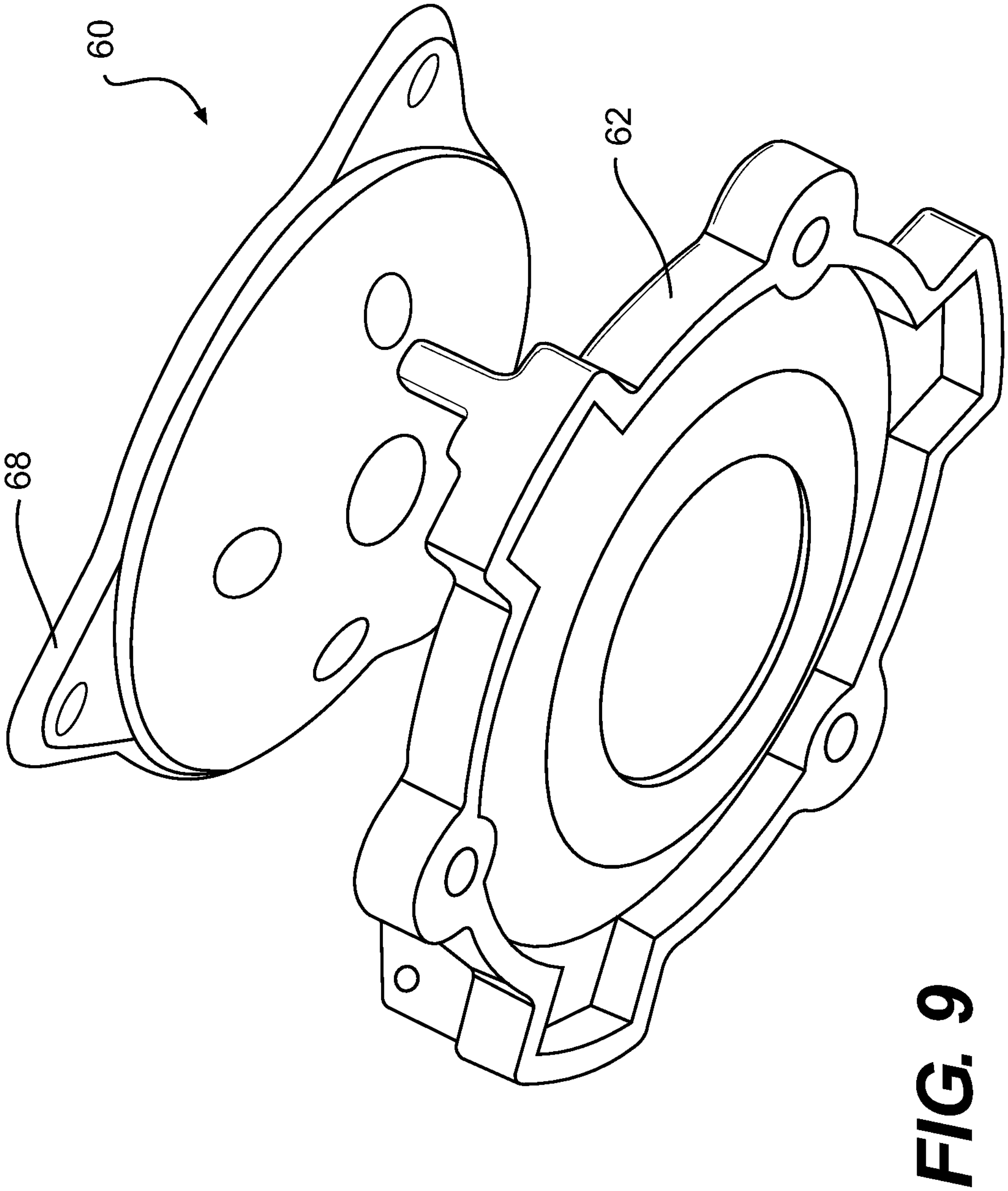
FIG. 9 is an exploded view of the moveable mixer component of the subject embodiment.
Figure 10:
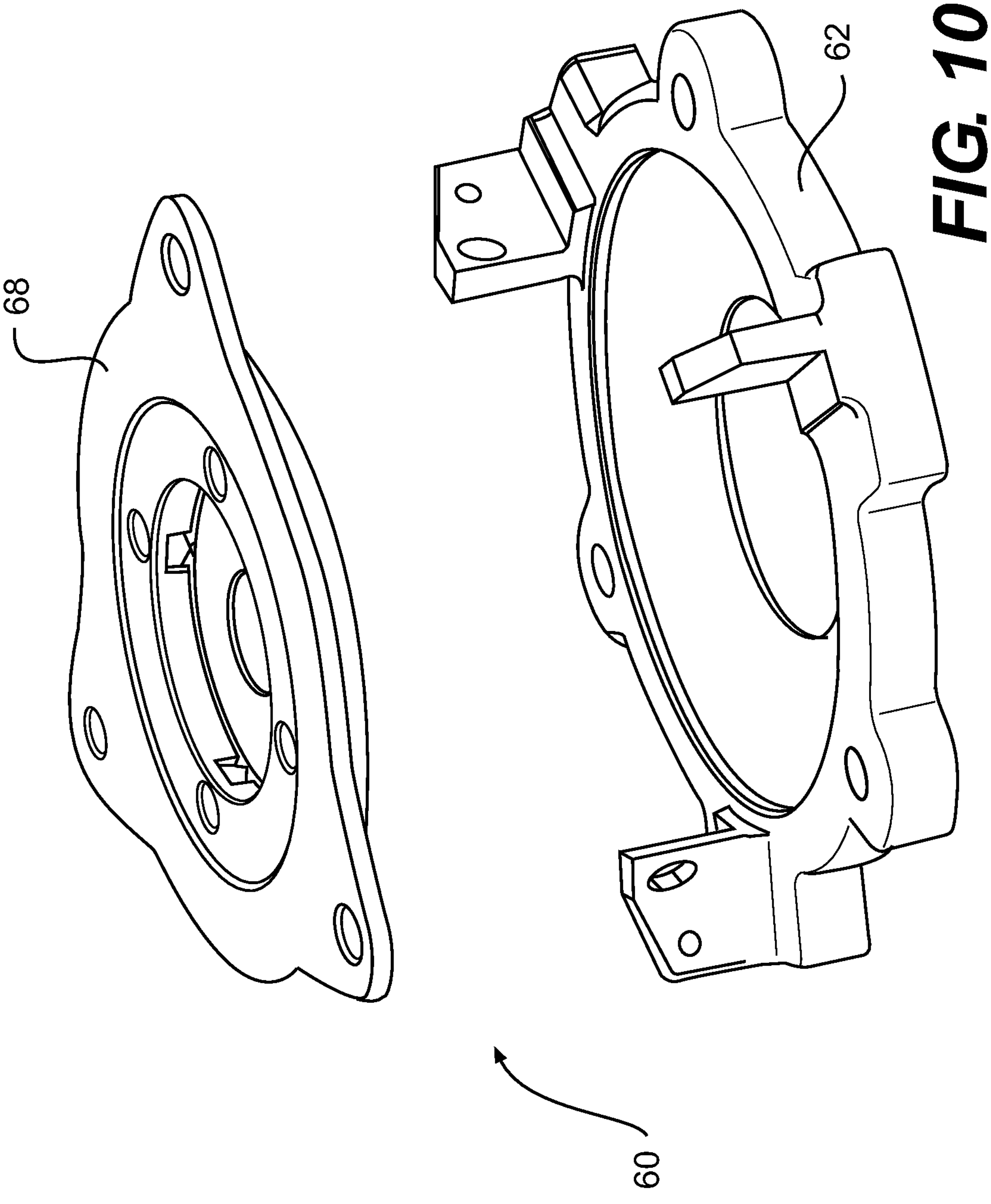
FIG. 10 is additional exploded view thereof.

With further reference to FIGS. 1 and 2, spindle mixer 10, in accordance with one embodiment of the disclosure, comprises housing 14, a motor 16 enclosed in housing 14, and agitator 12 extending downwardly from the motor through an aperture in the housing. Motor 16 is more particularly enclosed in a motor housing 17 that can further enclose various electronic components such as would be understood by one of skill in the art based on the disclosure herein.

For illustrative purposes, in FIG. 2, a back panel of housing 14 has been removed to expose motor 16 in motor housing 17. Motor 16 is mechanically linked to an agitator 18 at the end of the spindle shaft 12. The motor is energized to rotate agitator 18.

Figure 1A:
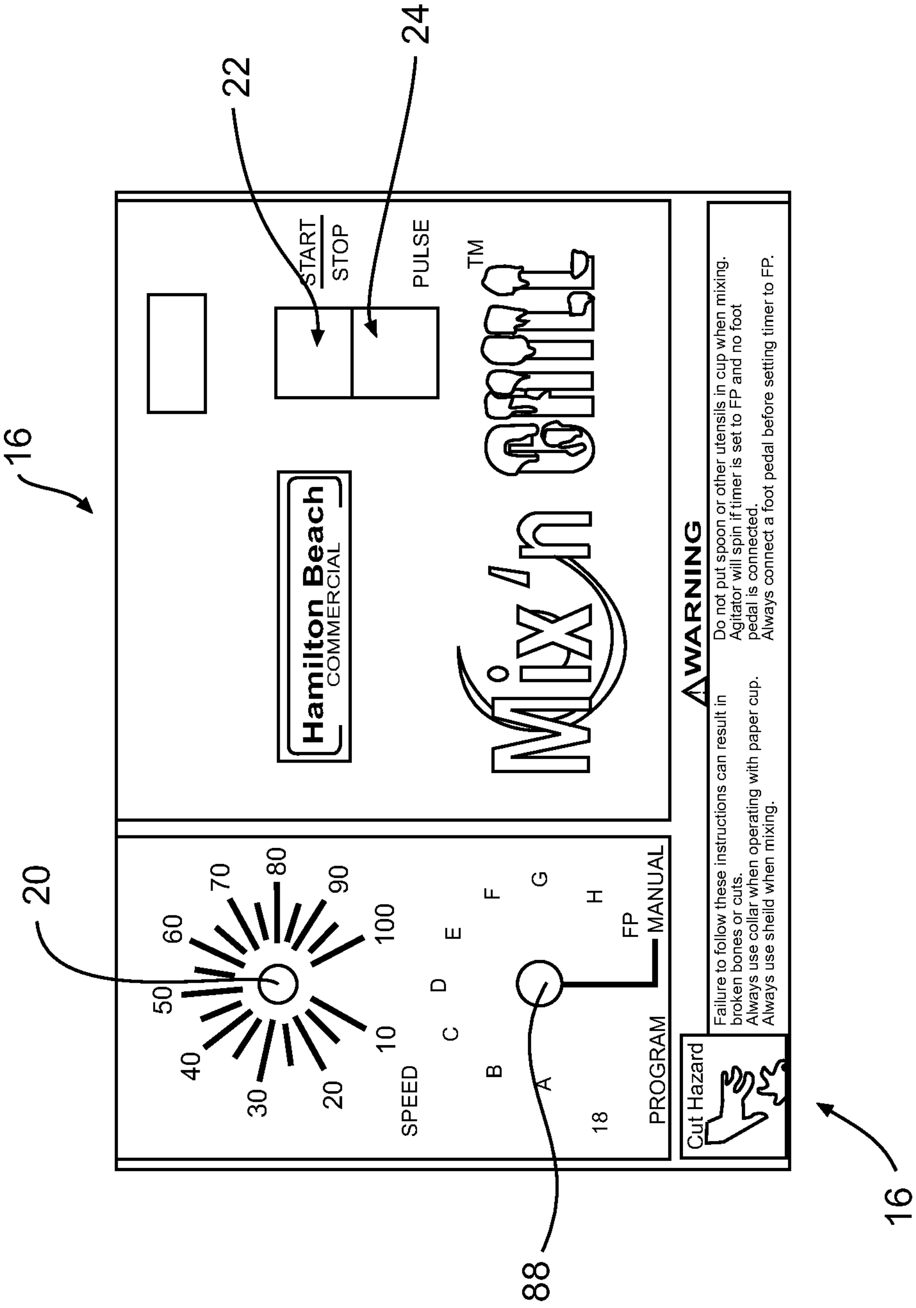
FIG. 1A is view of a control panel for the same.

The subject spindle mixer 10 may also include a control panel 16 with FIG. 1A provide one example thereof. Control panel 16 provides, in one embodiment, a mode selection switch 88, a manual speed selection switch 20, an on-off switch 22 and/or a pulse switch 24. Control panel 16 is electrically connected to the at least one motor switch, as described below, as well as motor 16. In the illustrated embodiment, mixer 10 further includes a recess 13 that partially encloses the space around spindle shaft 12. A selectively removable splash shield 15 can further enclose spindle shaft 12.

Mixer 10 does not include any separate actuator or switch located adjacent to spindle shaft 12 to the exterior of the spindle mixer housing 14. In other words, mixer 10 does not include any exterior cup-engaged switches, cup guides, brackets, or the like. Other than an aperture for spindle shaft 12 to extend from motor 16 and outwardly from housing 14, recess 13 comprises smooth walls to facilitate cleaning.

With reference now to FIG. 2-5, one embodiment the subject apparatus comprises motor 16 mounted in motor housing 17 to a moveable mixer component. In one embodiment, the moveable mixer component is a motor mounting plate 30.

Motor housing 17 further includes at least one motor switch 32. Motor switch 32 is fixedly mounted to a sidewall of motor housing 17. A switch arm 34 contacts the moveable component, namely plate 30.

While motor switch 32 is illustrated as a micro-switch in the various embodiments herein, it should be understood that switch 32 could comprise any number of mechanisms that use the physical movement of the moveable mixer component to selectively energize a mixer motor. For instance, switch 32 could be a hall effect or magnetic switch whereby a sensor could detect the movement of a target mounted on the moveable component (or vice versa). Switch 32 could also be an optical-based switch. Basically, switch 32 can be any suitable switch to open or close a circuit based on the movement of a moveable mixer component where the moveable mixer component is mechanically linked to the spindle shaft.

Housing 14 further includes an inwardly projecting and fixed shelf 36 on at least two sides of mixer housing 14. Moveable plate 30 is supported, in the illustrated embodiment, above shelf 36 via a fastener arrangement 40 in a manner that permits the relative movement of plate 30 to fixed shelf 36.

In the illustrated fastener arrangement, a socket head shaft is inserted upwardly through corresponding apertures in shelf 36 and plate 30. A screw 44 is threaded into socket head shaft 42 thereby securing shaft 42 in place. A pliable bushing 46, such as a rubber bushing, is placed around shaft 42 between plate 30 and shelf 36. The same or a corresponding upper bushing is also located between a head of screw 44 and plate 30. A washer 48 can be disposed between the screw head and the upper bushing portion. A spring 50 is located around shaft 42 below shelf 36. Shaft 42 contains a shoulder 52 as a spring seat.

As a result of the fastener arrangement 40, plate 30 can be biased away from or towards shelf 36. The motion of plate 30 actuates switch arm 34 to selectively open or close motor switch 32. Switch 32, in turn, selectively energizes motor 16 to thereby rotate spindle shaft 12.

Motor 16 is directly mounted or otherwise fastened to plate 30. The movement of plate 30 is effected by manually displacing spindle shaft 12. The displacement of shaft 12 causes motor 16 to rotate away from its vertical axis. The rotation of motor 16 causes the upward movement of plate 30 at switch 32 or compresses bushing 46 to move plate 30 away from switch 32 and switch arm 34.

Another embodiment of a motor switch assembly is illustrated in FIGS. 6-10. Motor 16 is secured to a moveable mixer component that comprises a ball and socket arrangement 60. The ball and socket arrangement includes a socket 62 mounted to a fixed floor 61 of motor housing 17. An aperture through socket 62 conforms to a spindle shaft aperture in housing 14. That is, the agitator shaft 12 extends through fixed socket 62.

At least one motor switch 64, such as a microswitch, is mounted on or proximate to socket 22 in a fixed relationship. Switch 64 includes a switch arm 65 in contact with a ball member 68 that fits in socket 62. Ball member 68 is rotatable in any direction within socket 62.

Motor 16 is mounted to ball member 68 via a collar 66. Spindle shaft 12 extends from motor 16 through collar 66, ball member 68, and socket 62, and floor 61. By this construction, manual force by the user on spindle shaft 12 causes spindle shaft 12 to move vertically or away from a vertical alignment. The movement of spindle shaft 12 causes an opposing movement of motor 16 and ball member 68, which are connected together by collar 66. As a result, ball member 68 rotates within socket 62 or is lifted away from socket 62. At least one switch arm 65 is actuated by the movement of ball member 68 to close a circuit (not illustrated) and initiate a mix cycle (i.e., energize mixer motor 16). The operation of spindle mixer motor 16 is thereby optionally shaft-actuated.

The subject mixer motor 16 is centered on the ball member 68. Socket 62 provides a concave recess. The lower portion of ball member 68 includes a convex surface. The convex surface rotates within the socket recess such that ball member 68 is naturally biased into a centered position within socket 62. As such, spindle shaft 12 is biased to a vertical position when a user does not engage spindle shaft 12.

Variations on the moveable mixer component are envisioned. Operation of a motor switch 32, 64 may also vary. In one embodiment, the at least one switch 32, 64 is in the open position until movement of the moveable component closes one or more of the switches 32, 64 via switch arms 34, 65. Closing a switch 32, 64 may instantly engage mixer motor 16.

In one embodiment, it is envisioned that a switch 32, 64 must be held in the closed position for a period of time prior to activation of motor 16. To accomplish this, a user of spindle mixer 10 would displace spindle shaft 12 for a predetermined period of time. It is also possible to require constant displacement pressure on shaft 12 to maintain operation of motor 16. In other words, the user would have to continually hold or press shaft 12. Releasing shaft 12 would release switch 32 and motor 16 would then de-energize. On the other hand, a motor switch in accordance with the disclosure herein does not need to stay closed during a mix cycle to maintain operation of motor 16. Instead, a user of spindle mixer 10 can release pressure on spindle shaft 12 as soon as motor 16 is activated. A corresponding, later displacement of spindle shaft 12 can then deactivate motor 16 or a user can select the on/off button on control 16 to bypass motor switch 65, as described above.

Using mode selection switch/knob 88, a user can place spindle mixer 10 in a manual mode whereby actuation of spindle shaft 12 or on/off switch 22 causes motor 16 to engage at a speed determined by speed selection switch/knob 20. Motor 16 will remain energized until the user displaces shaft 12 or actuates on/off switch 22.

Alternatively, a user can select a number of preset cycles via mode selection switch 88. In this mode, once motor 16 is activated via shaft 12 or on/off switch 22, a mix cycle will run for a predetermined period of time and with predetermined characteristics. For instance, a predetermined mix cycle may include a ramp up speed, one or more target speeds that the motor will alternate between, and a ramp down speed. In this manner, preset mix cycles can be used for different food/drink recipes. During a preset cycle, the user can move the cup (not illustrated) during the mix cycle. If the user displaces spindle shaft 12 during the mix cycle, the mix cycle will continue until it is complete. In one embodiment, it is thought that displacing spindle shaft 12 during a mix cycle might terminate the cycle if there is time remaining during the preset mix cycle.

As referenced above, bypass on/off switch 22 permits a user to terminate a manual mix cycle or prematurely terminate end a preset mix cycle. It is also possible that logic controls in the mixer could adjust a mix program (e.g., mix time and agitator speed) automatically.

Pulse switch 24 provides additional motor control in that it can be actuated to temporarily activate motor 16. In yet another embodiment, the spindle mixer may include a visual or audible "start" signal/alarm to indicate the mixer motor is about to be engaged. Therefore, there is some indication to the user that spindle shaft 12 is about to rotate.

Overall, the subject motor switch 32, 64 is wholly housed within mixer housing 14 or, more specifically, motor housing 17. By mounting shaft 12 to a moveable motor 16 on a moveable mixer component such as a moveable mounting plate 30 or ball member 68, a user can engage a spindle mixer without the user or cup directly touching a switch, cup guide, or the like. The resulting shaft-actuated spindle mixer 10 is easier to clean, less prone to contamination, and easier to operate relative to known spindle mixers.

While the apparatus has been described with reference to specific embodiments thereof, it will be understood that numerous variations, modifications and additional embodiments are possible, and all such variations, modifications, and embodiments are to be regarded as being within the spirit and scope of the disclosure.

What is claimed is:

1. A spindle mixer system comprising:

a housing;

a motor enclosed in the housing, the motor mounted to a moveable mixer component positioned within the housing, the motor being moveable about one or more axes via the moveable mixing component;

at least one motor switch enclosed by the housing, the at least one motor switch actuated by the movement of the moveable mixer component;

a spindle shaft mechanically connected to the motor and extending from the housing, the spindle shaft being forcibly displaceable; and the displacement of the spindle shaft operable to rotate the motor from its vertical axis and to actuate the at least one motor switch via the moveable mixer component and the actuation of the at least one motor switch selectively energizing the motor.

2. The system of claim 1, further comprising an audible alarm, the audible alarm being activated prior to energizing the motor.

3. The system of claim 1, further comprising the at least one switch in the closed position for a predetermined period of time prior to energizing the motor.

4. The system of claim 3, further comprising the mixer motor being de-energized when the at least one switch is released.

* * * * *